(12) United States Patent
Kim

(10) Patent No.: US 11,651,681 B2
(45) Date of Patent: May 16, 2023

(54) SYSTEM AND METHOD FOR GENERATING TRAFFIC INFORMATION

(71) Applicants: HYUNDAI MOTOR COMPANY, Seoul (KR); KIA MOTORS CORPORATION, Seoul (KR)

(72) Inventor: Tae Heon Kim, Gyeonggi-do (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 188 days.

(21) Appl. No.: 17/065,350

(22) Filed: Oct. 7, 2020

(65) Prior Publication Data
US 2022/0036726 A1    Feb. 3, 2022

(30) Foreign Application Priority Data
Aug. 3, 2020  (KR) .................. 10-2020-0096960

(51) Int. Cl.
G08G 1/01       (2006.01)
G08G 1/052      (2006.01)
G06V 20/58      (2022.01)
H04L 67/12      (2022.01)

(52) U.S. Cl.
CPC ......... G08G 1/0125 (2013.01); G06V 20/584 (2022.01); G08G 1/012 (2013.01); G08G 1/052 (2013.01); H04L 67/12 (2013.01)

(58) Field of Classification Search
CPC ...... G08G 1/0125; G08G 1/012; G08G 1/052; G08G 1/0108; G08G 1/065; G08G 1/075; G08G 1/095; G06V 20/584; G06V 20/56; G06V 20/54; H04L 67/12; H04W 4/027; H04W 4/40; H04W 4/46; G06Q 50/30
See application file for complete search history.

(56) References Cited

U.S. PATENT DOCUMENTS

2020/0180612 A1*  6/2020  Finelt ................ G06V 20/58
2021/0166556 A1   6/2021  Park

FOREIGN PATENT DOCUMENTS

KR    20160049691       *  5/2016
KR    10-2021-0069446 A   6/2021
WO    WO-2017077608 A1 *  5/2017

* cited by examiner

Primary Examiner — Kim T Nguyen
(74) Attorney, Agent, or Firm — Morgan, Lewis & Bockius LLP

(57) ABSTRACT

A system and a method for generating traffic information are provided. The system for generating traffic information includes a vehicle that obtains a location and a surrounding image in real time, and a server that receives the location and the surrounding image from the vehicle, and calculates a time required to pass through a specified section and an average speed passing through the specified section based on the location and the surrounding image from the vehicle.

12 Claims, 8 Drawing Sheets

SYSTEM AND METHOD FOR GENERATING TRAFFIC INFORMATION

CROSS-REFERENCE TO RELATED APPLICATION

This application claims the benefit and the priority to Korean Patent Application No. 10-2020-0096960, filed on Aug. 3, 2020, the entire contents of which are incorporated herein by reference.

TECHNICAL FIELD

The present disclosure relates to a system and a method for generating traffic information.

BACKGROUND

Recently, a technology for providing traffic information in real time for the convenience of users has been developed. For example, traffic information may be generated by using a probe vehicle that provides a connected car service. When the probe vehicle passes through an intersection, traffic information may be provided by using traffic light information and time required to pass through the intersection.

However, in the above-described scheme, because the generated traffic information is provided after the probe vehicle completely passes through an intersection, it takes a lot of time to pass through the intersection, specifically in a congested situation, so the traffic information generated after probe vehicle passes through the intersection becomes traffic information in the past. For example, when a vehicle enters a section of 1 km at 8:00 and advances at 8:20, traffic information cannot be provided to the vehicle entering at 8:00, and there is a limit of providing the traffic information only to a vehicle entering after 8:20.

SUMMARY

An aspect of the present disclosure provides a system and a method for generating traffic information, which can provide traffic information based on location information of a vehicle and image information obtained in real time.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for generating traffic information includes a vehicle that obtains a location and a surrounding image in real time, and a server that receives the location and the surrounding image from the vehicle, and calculates a time required to pass through a specified section and an average speed passing through the specified section based on the location and the surrounding image from the vehicle.

The server may determine a place at which the vehicle is stopped based on the location of the vehicle, and set a section to a road equipped with a traffic light as the specified section.

The server may calculate the required time based on a lighting period of the traffic light, a moving distance during the lighting period, and a waiting time to lighting a green light at the location of the vehicle.

The server may calculate and store an average moving distance of a population of a plurality of sample vehicles as the moving distance during the lighting period.

The server may calculate the average speed passing through the specified section based on a distance of the specified section and the required time.

The server may determine whether a heavy vehicle is detected in front of the vehicle based on the surrounding image of the vehicle, and correct a distance of the specified section by using a number of heavy vehicles and a correction coefficient of the heavy vehicle when the server determines that the heavy vehicle is detected.

The server may detect the number of heavy vehicles in the specified section based on a first surrounding image of the vehicle or a second surrounding image of a vehicle driving around the vehicle.

The server may generate the traffic information based on the required time and the average speed, and transmit the traffic information to the vehicle.

According to another aspect of the present disclosure, a method of generating traffic information includes obtaining, by a vehicle, a location and a surrounding image in real time, and receiving, by a server, the location and the surrounding image from the vehicle, and calculating a time required to pass through a specified section and an average speed passing through the specified section based on the location and the surrounding image from the vehicle.

The method may further include determining, by the server, a place at which the vehicle is stopped based on the location of the vehicle, and setting a section to a road equipped with a traffic light as the specified section.

The method may further include calculating, by the server, the required time based on a lighting period of the traffic light, a moving distance during the lighting period, and a waiting time to lighting a green light at the location of the vehicle.

The method may further include calculating and storing, by the server, an average moving distance of a population of a plurality of sample vehicles as the moving distance during the lighting period.

The method may further include calculating, by the server, the average speed passing through the specified section based on a distance of the specified section and the required time.

The method may further include determining, by the server, whether a heavy vehicle is detected in front of the vehicle based on the surrounding image of the vehicle, and correcting, by the server, a distance of the specified section by using a number of heavy vehicles and a correction coefficient of the heavy vehicle when the server determines that the heavy vehicle is detected.

The method may further include detecting, by the server, the number of heavy vehicles in the specified section based on a first surrounding image of the vehicle or a second surrounding image of a vehicle driving around the vehicle.

The method may further include generating, by the server, the traffic information based on the required time and the average speed, and transmitting the traffic information to the vehicle.

DRAWINGS

Further areas of applicability will become apparent from the description provided herein. It should be understood that the description and specific examples are intended for purposes of illustration only and are not intended to limit the scope of the present disclosure.

DETAILED DESCRIPTION

Figure 1:
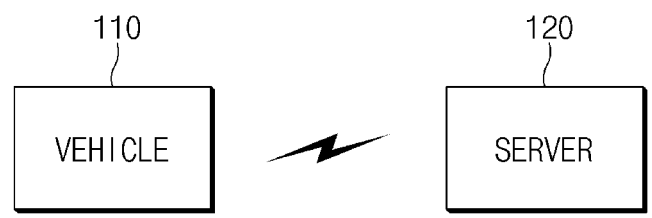
FIG. 1 is a view illustrating the configuration of a system for generating traffic information in one form of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the tams do not limit the nature, sequence or order of the constituent components. Unless otherwise defined, all terms used herein, including technical or scientific terms, have the same meanings as those generally understood by those skilled in the art to which the present disclosure pertains. Such teams as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating the configuration of a system for generating traffic information in some forms of the present disclosure.

As shown in FIG. 1, a system 100 for generating traffic information in some forms of the present disclosure may include a vehicle 110 and a server 120.

The vehicle 110 may obtain a current location and a surrounding image in real time, and may transmit the obtained information to the server 120. In addition, the vehicle 110 may receive traffic information generated from the server 120, and output the received traffic information to guide a user. The more detailed description of the vehicle 110 refers to FIG. 2.

The server 120 may receive the vehicle location and the surrounding image of the vehicle from the vehicle 110, and may calculate a time required to pass through a specified section based on the location of the vehicle and the surrounding image of the vehicle and the average speed passing through the specified section. In addition, the server 120 may generate the traffic information based on the time required to pass through the specified section and the average speed passing through the specified section, and transmit the generated traffic information to the vehicle 110. The details will be described with reference to FIG. 3.

Figure 2:
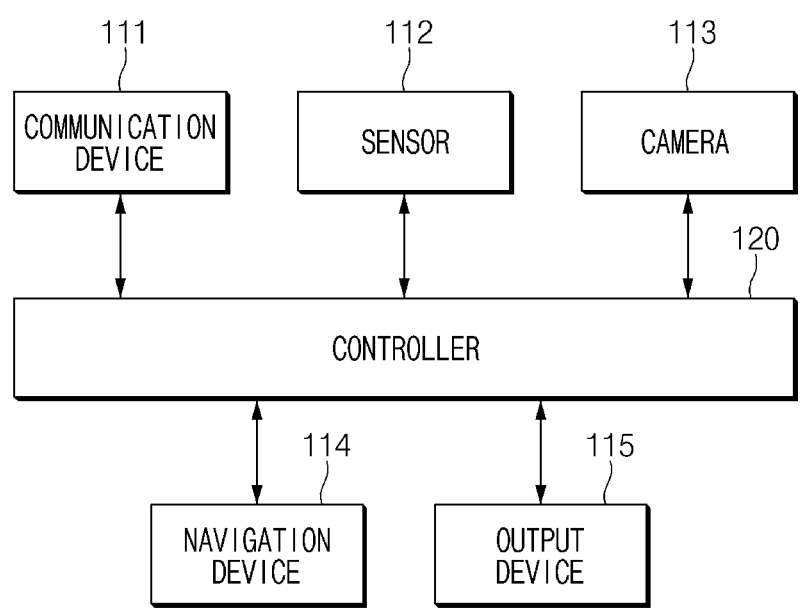
FIG. 2 is a view illustrating the configuration of a vehicle in one form of the present disclosure.

FIG. 2 is a view illustrating the configuration of a vehicle in some forms of the present disclosure.

As shown in FIG. 2, the vehicle 110 in some forms of the present disclosure may include a communication device 111, a sensor 112, a camera 113, a navigation device 114, an output device 115, and a controller 116.

The communication device 111 may transmit information obtained through the sensor 112, the camera 113, and the navigation device 114 to the server 120 in real time. The communication device 111 may communicate with the server 120 in various communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. In addition, the communication device 111 may perform V2V communication for transmitting and receiving information to and from surrounding vehicles.

The sensor 112 may detect an obstacle around the vehicle. According to an embodiment, the sensor 112 may include an ultrasonic sensor, a radar, a lidar, and the like, and may detect a vehicle running in front of the vehicle.

The camera 113 may obtain an image around the vehicle. According to an embodiment, the camera 113 may obtain an image of a heavy vehicle including a bus, a truck, and the like running in front of the vehicle.

The navigation device 114 may include a GPS receiving device to receive a current location of the vehicle and provide map image information of a specific area based on the current location of the vehicle.

The output device 115 may include a speaker for outputting traffic information received from the server 120 as a voice, and a display for outputting an image.

The controller 116 may be implemented with various processing devices such as a microprocessor including a semiconductor chip capable of performing operation or execution of various commands, and control the operation of the vehicle according to the present disclosure. According to an embodiment, the controller 116 may control to transmit the information obtained from the sensor 112 and the navigation device 114 to the server 120, and when traffic information is received from the server 120, the controller 116 may control to output the traffic information through the output device 115.

Figure 3:
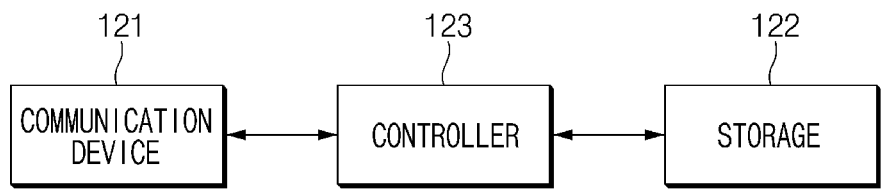
FIG. 3 is a view illustrating the configuration of a server in one form of the present disclosure.

FIG. 3 is a view illustrating the configuration of a server in some forms of the present disclosure.

As shown in FIG. 3, the server 120 may include a communication device 121, storage 122, and a controller 123.

The communication device 121 may receive vehicle information from the vehicle 110 and transmit traffic information generated by the controller 123 to the vehicle 110. According to an embodiment, the communication device 121 may communicate with the vehicle 110 in various communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. According to an embodiment of the present disclosure, the communication device 121 may communicate not only with the vehicle 110 but also with vehicles around the vehicle 110.

The storage 122 may store data previously calculated by the server 120. In addition, the storage 122 may store at least one algorithm that performs operations or executions of various commands for the operation of the server according to an embodiment of the present disclosure. The storage 122 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 123 may be implemented with various processing devices such as a microprocessor including a semiconductor chip capable of performing operation or execution of various commands, and control the operation of a sever according to the present disclosure. In detail, the controller 123 may receive the vehicle location and the surrounding image of the vehicle from the vehicle 110, and calculate the time required to pass through a specified section based on the location of the vehicle and the surrounding image of the vehicle and the average speed passing through the specified section. In this case, the specified section may mean a section from the current location of the vehicle (the place where the vehicle is stopped) to a road equipped with a traffic light.

The controller 123 may calculate a time required to pass through the specified section based on a lighting period of a traffic light provided at the end point of the specified section, a moving distance during the lighting period, and a waiting time to lighting a green light at the location of the vehicle. In this case, the lighting period may mean a first time until the next green light is turned on after a green light is turned on, or a second time until the next red light is turned on after a red light is turned on. The moving distance during the lighting period may mean a distance that the vehicle has moved for the first time or the second time. According to an embodiment, the controller 123 may calculate the moving distance during the lighting period by using the average moving distance of a population sampled from a plurality of sample vehicles. For example, the controller 123 may calculate the average moving distance of the population by using the t-distribution (Equation 1) in the 95% confidence interval.

$$T = \frac{(E(X) - \mu)\sqrt{N-1}}{s} \quad \text{[Equation 1]}$$

Figure 4:
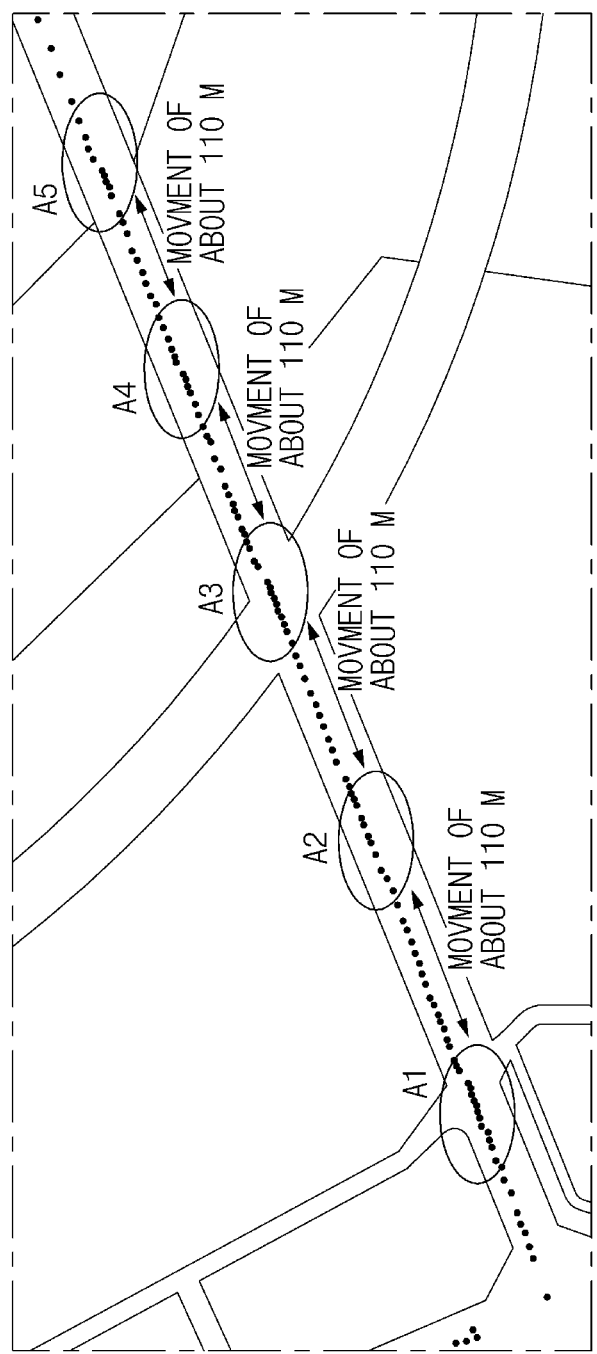
FIG. 4 is a view schematically illustrating a moving distance per traffic signal period in one form of the present disclosure.

T: Statistics based on t distribution
E(X): Average of N moving distance samples
μ: Average of moving distance population
N: Number of moving distance samples
s: Standard deviation of N moving distance samples The details will be described will be given with reference to FIG. 4. FIG. 4 is a view schematically illustrating a moving distance per traffic signal period in some forms of the present disclosure.

As shown in FIG. 4, the controller 123 may obtain stop points A1, A2, A3, A4 and A5 from a plurality of sample vehicles, and calculate a moving distance during the lighting period through Equation 1. In some forms of the present disclosure, the controller 123 may calculate a moving distance of 110 m during the lighting period.

Hereinafter, the operation of the controller 123, in which the time required to pass through the specified section is calculated based on the lighting period of a traffic light provided at the end point of the specified section, the moving distance during the lighting period, and the waiting time to lighting a green light at the location of the vehicle, will be described in detail with reference to FIG. 5.

Figure 5:
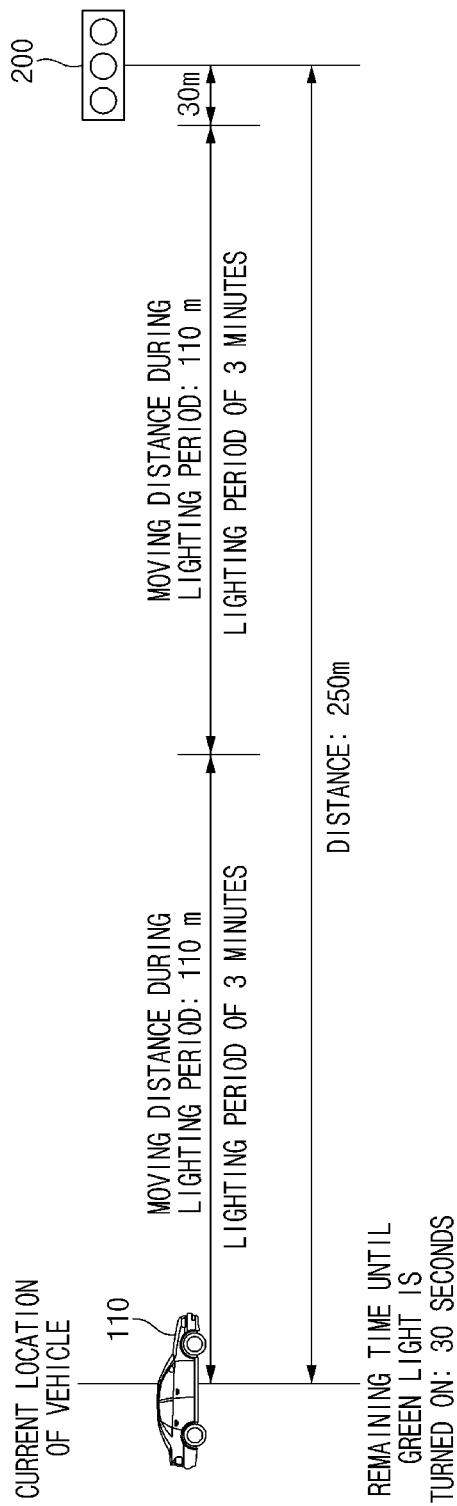
FIG. 5 is a view schematically illustrating a scheme of generating traffic information in one form of the present disclosure.

FIG. 5 is a view schematically illustrating a scheme of generating traffic information in some forms of the present disclosure.

As shown in FIG. 5, the controller 123 may determine that the distance of the specified section (the section from the vehicle location to the road provided with a traffic light) is 250 m, and the lighting period of a traffic light 200 may be three minutes. The moving distance during the lighting period may be calculated to be 110 m. When it is determined that the remaining time until the green light is turned on at the current location of the vehicle is 30 seconds, the time required to pass through the specified section may be calculated through following Formula 1.

Required time=30 seconds+3 minutes+3 minutes+30 m/average vehicle speed     <Formula 1>

In addition, the controller 123 may calculate an average speed for passing through the specified section by dividing the distance of the specified section by the required time.

Meanwhile, the controller 123 may determine whether a heavy vehicle is detected in front of the vehicle based on the surrounding image of the vehicle, and when it is determined that the heavy vehicle is detected, the controller 123 may correct the distance of the specified section by using a correction coefficient of the heavy vehicle. In this case, the heavy vehicle may generally mean a large vehicle including a bus, a truck, and the like, which has lower driving performance than a passenger vehicle and six tires or more in contact with the road surface. Because the heavy vehicle has a slower driving speed than a general vehicle, when a heavy vehicle is included within a distance of a specified section, the moving distance may decrease during the lighting period, so that accurate traffic information may not be calculated. Accordingly, the controller 123 may compensate the distance of a specified section by applying the moving speed of the heavy vehicle to calculate accurate traffic information.

Hereinafter, the operation of correcting the distance of a specified section by the controller 123 will be described with reference to FIG. 6.

Figure 6:
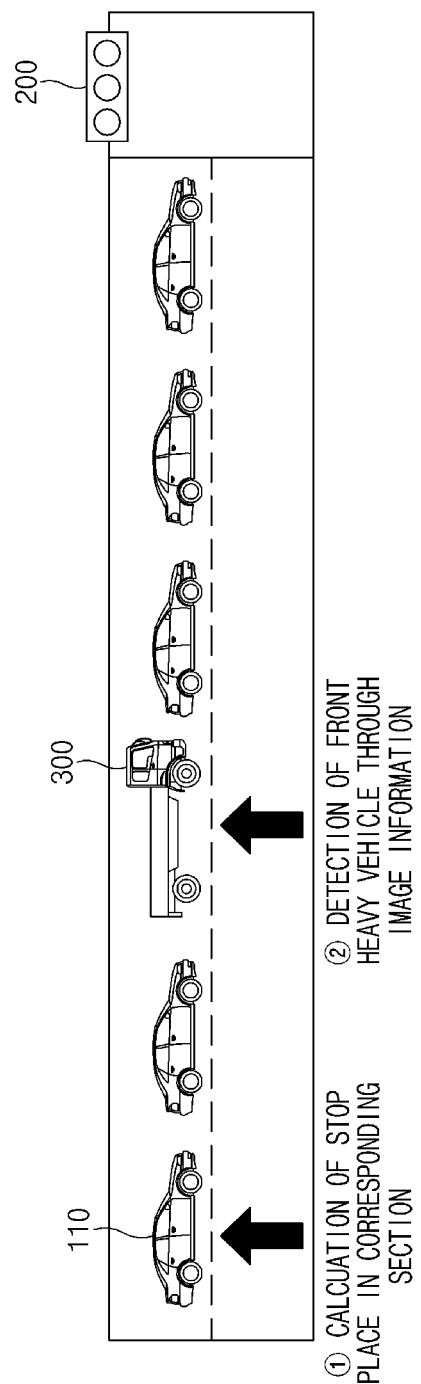
FIG. 6 is a view schematically illustrating a method of generating traffic information by reflecting a heavy vehicle in front of a vehicle in one form of the present disclosure.

FIG. 6 is a diagram schematically showing a method of generating traffic information by reflecting a heavy vehicle in front of a vehicle in some forms of the present disclosure.

As shown in FIG. 6, the controller 123 may detect the length of a heavy vehicle 300 in front of the vehicle based on the surrounding image of the vehicle 110, and may correct the distance of the specified section by using following Formula 2 corresponding to the length of the heavy vehicle 300, to which a heavy vehicle correction coefficient is applied. In this case, the heavy vehicle correction coefficient may mean a traffic reduction rate that may be processed as a value for a ratio that decreases compared to a general passenger vehicle when calculating the saturated traffic volume at a signal intersection, and may be calculated by a scheme well known in the art based on the length of the heavy vehicle.

Corrected distance=distance of specified section (e.g., 110 m)/heavy vehicle correction coefficient     <Formula 2>

According to an embodiment, the controller 123 may detect the number of heavy vehicles 300 within the specified section based on the surrounding image obtained by the vehicle 110 and the image received from a surrounding vehicle, and may apply the number of heavy vehicles 300 for correcting the distance. For example, when the distance that the vehicle 110 can detect is 'a', the controller 123 may detect the number of heavy vehicle 300 in the surrounding image and may detect the number of heavy vehicles 300 in the surrounding images in 'a' of vehicles (surrounding vehicles) stopped within the specified section. In addition, the controller 123 may correct the distance of the specified section by applying the number of heavy vehicles 300 detected within the specified section in the manner described above. When the controller 123 detects two heavy vehicles 300 within the specified section, the corrected distance may be calculated through following Formula 3.

About 120 m=distance of specified section (e.g., 110 m)/heavy vehicle correction coefficient (0.96)/heavy vehicle correction coefficient (0.96)  <Formula 3>

That is, when there is no heavy vehicle within the specified section, the controller 123 may determine that the distance of the specified section is 110 m, but when two heavy vehicles are detected, the distance of the specified section may be corrected through Formula 3 so that the controller 123 determines that the distance is 120 m. Accordingly, when the heavy vehicle is detected, the controller 123 may increase the specified section by the number of heavy vehicles so that it is possible to more accurately calculate the time required to pass through the specified section and the speed.

The controller 123 may recalculate the time required to pass through the specified section and the average speed passing through the specified section by using the corrected distance as described above.

As described above, the controller 123 may generate the traffic information based on the time required for the vehicle to pass through the specified section and the average speed passing through the specified section, and transmit the traffic information to the vehicle 110. In addition, the controller 123 may calculate the required time and average speed by extending and applying the specified section set according to an embodiment of the present disclosure on a road having a plurality of consecutive intersections. Hereinafter, the operation of calculating, by the controller 123, the required time and average speed on a road with a plurality of intersections will be described with reference to FIG. 7.

Figure 7:
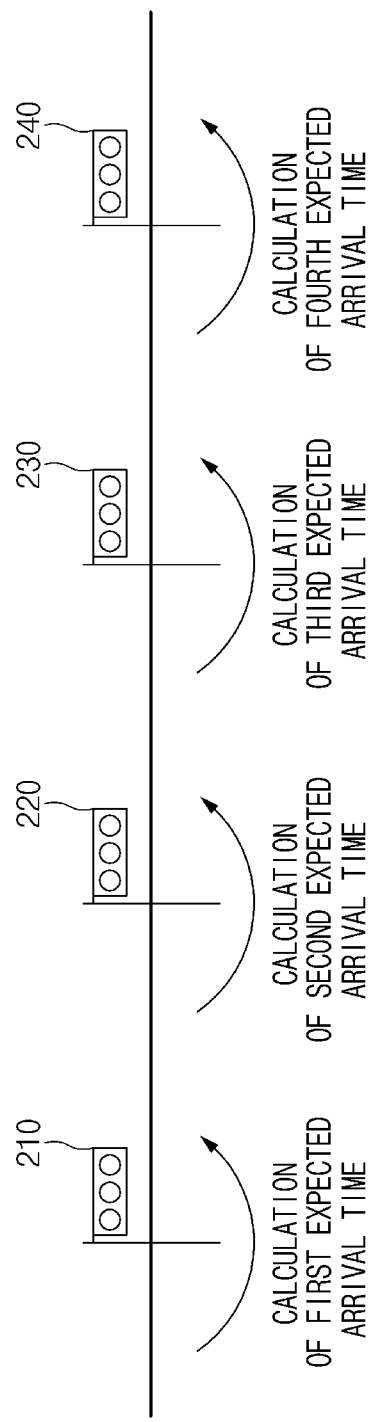
FIG. 7 is a view schematically illustrating a configuration of generating traffic information in a plurality of sections in one form of the present disclosure.

FIG. 7 is a view schematically illustrating a configuration of generating traffic information in a plurality of sections in some forms of the present disclosure.

As shown in FIG. 7, when a plurality of intersections provided with first to fourth traffic lights 210 to 240 are continuous, the controller 123 may calculate an first expected arrival time based on the required time and the average speed for a specified section up to the first traffic light 210. In such a scheme, the second to fourth expected arrival times at each intersection may be calculated by calculating the required time and the average speed for each specified section up to the second to fourth traffic lights 220 to 240.

Figure 8:
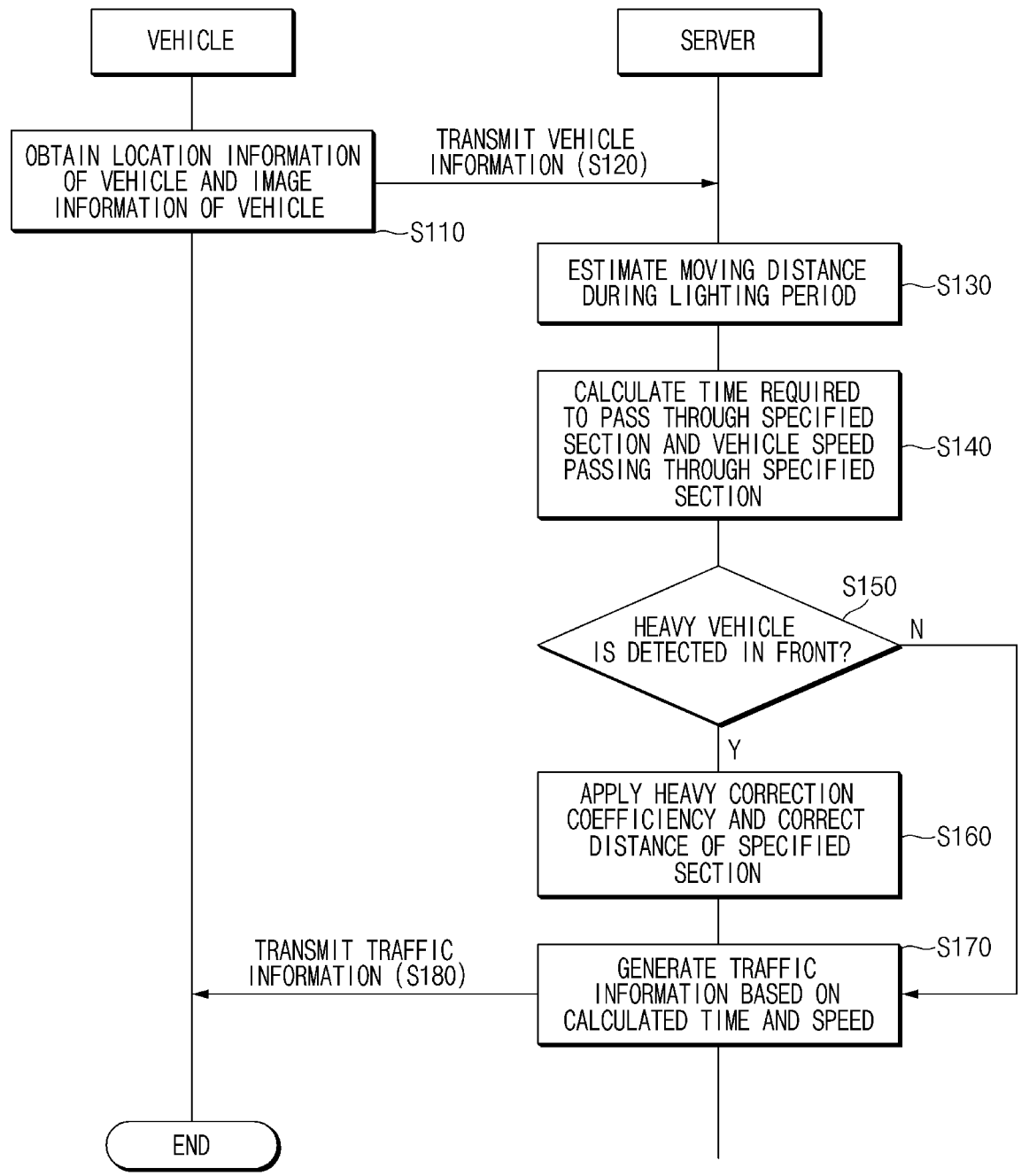
FIG. 8 is a view illustrating a method of generating traffic information in one form of the present disclosure.

FIG. 8 is a view illustrating a method of generating traffic information in some forms of the present disclosure.

As shown in FIG. 8, the vehicle 110 may obtain location information and image information thereof in S110, and may transmit the vehicle information obtained in S110 to the server 120 in S120.

In S130, the server 120 may calculate and store the moving distance during the lighting period by using the average moving distance of a population sampled from a plurality of sample vehicles. According to an embodiment, in S130, the vehicle 110 may calculate the average moving distance of the population by using the t-distribution (Equation 1) in the 95% confidence interval as the moving distance during the lighting period. As an example, the average moving distance may be calculated by using Equation 1.

In S140, the server 120 may calculate the time required for the vehicle 110 to pass through the specified section and the average speed passing through the specified section. In S140, the server 120 may calculate the required time based on the lighting period of the traffic light provided at the end point of the specified section, the moving distance during the lighting period, and the waiting time to lighting the green light at the location of the vehicle. In addition, the server 120 may calculate the average speed passing through the specified section by dividing the distance of the specified section by the required time.

In S150, the server 120 determines whether a heavy vehicle is detected in front of the vehicle 110. In S150, the heavy vehicle may generally mean a large vehicle including a bus, a truck, and the like, which has lower driving performance than a passenger vehicle and six tires or more in contact with the road surface. When it is determined in S150 that the heavy vehicle is detected in front of the vehicle (Y), in S160, the server 120 may correct the distance of the specified section by using the correction coefficient of the heavy vehicle. In S160, according to an embodiment, the controller 123 may detect the number of heavy vehicles 300 within the specified section based on the surrounding image of the vehicle 110 and the image obtained from a vehicle around the vehicle 110, and may apply it to correct the distance of the specified section.

When it is determined that a heavy vehicle is detected in front of the vehicle 110, in S170, the server 120 may calculate the time required to pass through the specified section based on the distance of the specified section corrected in S160, and may generate traffic information based on the average speed passing through the specified section. In addition, when it is determined that the heavy vehicle is not detected in front of the vehicle 110, in S170, the server 120 may generate the traffic information based on the required time and average speed calculated in S140.

In S180, the server 120 may transmit the traffic information generated in S170 to the vehicle 110, and, although not shown, the vehicle 110 may output the traffic information received from the server 120 through the output device.

The system and method for generating traffic information according to an embodiment of the present disclosure may calculate the driving speed and required time to the intersection based on the location information of the vehicle and the image information obtained in real time, such that it is possible to provide traffic information with improved accuracy in real time.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A system for generating traffic information, the system comprising:
a vehicle configured to obtain a location of the vehicle and a surrounding image in real time; and
a server configured to:
receive the location and the surrounding image from the vehicle; and
calculate a required time to pass through a specified section and an average speed passing through the specified section based on the location and the surrounding image,
wherein the specified section includes a section from a place at which the vehicle is stopped to a road equipped with a traffic light,
wherein the server is further configured to:
determine whether a heavy vehicle is detected in front of the vehicle based on the surrounding image; and
correct a distance of the specified section by using a number of heavy vehicles and a correction coefficient of the heavy vehicle when it is determined that the heavy vehicle is detected, and
wherein the heavy vehicle includes an additional vehicle which has six tires or more in contact with a road surface.

2. The system of claim 1, wherein the server is further configured to:
calculate the required time based on a lighting period of the traffic light, a moving distance during the lighting period, and a waiting time to lighting a green light at the location.

3. The system of claim 2, wherein the server is further configured to:
calculate an average moving distance of a plurality of sample Vehicles; and
store the average moving distance as the moving distance during the lighting period.

4. The system of claim 3, wherein the server is further configured to:
calculate the average speed passing through the specified section based on a distance of the specified section and the required time.

5. The system of claim 1, wherein the server is further configured to:
detect the number of heavy vehicles in the specified section based on a first surrounding image of the vehicle or a second surrounding image of a surrounding vehicle driving around the vehicle.

6. The system of claim 1, wherein the server is further configured to:
generate the traffic information based on the required time and the average speed; and
transmit the traffic information to the vehicle.

7. A method of generating traffic information, the method comprising:
obtaining, by a vehicle, a location of the vehicle and a surrounding image in real time; and
receiving, by a server, the location and the surrounding image from the vehicle and calculating a required time to pass through a specified section and an average speed passing through the specified section based on the location and the surrounding image,
wherein the specified section includes a section from a place at which the vehicle is stopped to a road equipped with a traffic light,
wherein the server is configured to:
determine whether a heavy vehicle is detected in front of the vehicle based on the surrounding image; and
correct a distance of the specified section by using a number of heavy vehicles and a correction coefficient of the heavy vehicle when it is determined that the heavy vehicle is detected, and
wherein the heavy vehicle includes an additional vehicle which has six tires or more in contact with a road surface.

8. The method of claim 7, wherein the method further comprises:
calculating, by the server, the required time based on a lighting period of the traffic light, a moving distance during the lighting period, and a waiting time to hating a green light at the location.

9. The method of claim 8, Wherein the method further comprises:
calculating, by the server, an average moving distance of a plurality of sample vehicles; and
storing the average moving distance as the moving distance during the lighting period.

10. The method of claim 9, wherein the method further comprises:
calculating, by the server, the average speed passing through the specified section based on a distance of the specified section and the required time.

11. The method of claim 7, wherein the method further comprises:
detecting, by the server, the number of heavy vehicles in the specified section based on a first surrounding image of the vehicle or a second surrounding image of a surrounding vehicle driving around the vehicle.

12. The method of claim 7, wherein the method further comprising:
generating, by the server, the traffic information based on the required time and the average speed; and
transmitting the traffic information to the vehicle.

* * * * *